United States Patent [19]

Tsuda et al.

[11] Patent Number: 5,777,585
[45] Date of Patent: Jul. 7, 1998

[54] ANTENNA COUPLING APPARATUS, EXTERNAL-ANTENNA CONNECTING APPARATUS, AND ONBOARD EXTERNAL-ANTENNA CONNECTING APPARATUS

[75] Inventors: Shinichiro Tsuda, Tokyo; Yoshiki Kanayama, Saitama; Tomoya Yamaura, Tokyo; Shinichi Kuroda, Saitama, all of Japan

[73] Assignee: Sony Corporation, Tokyo, Japan

[21] Appl. No.: 627,580

[22] Filed: Apr. 4, 1996

[30] Foreign Application Priority Data

Apr. 8, 1995 [JP] Japan .................. 7-108216

[51] Int. Cl.⁶ .................. H01Q 1/24
[52] U.S. Cl. .................. 343/702; 343/906; 343/841
[58] Field of Search .................. 343/702, 713, 343/715, 711, 712, 841, 906, 846, 848; 455/89, 90; H01Q 1/24

[56] References Cited

U.S. PATENT DOCUMENTS

| | | | |
|---|---|---|---|
| 5,121,504 | 6/1992 | Toko | 343/702 |
| 5,532,703 | 7/1996 | Stephens et al. | 343/702 |
| 5,557,287 | 9/1996 | Pottala et al. | 343/702 |

*Primary Examiner*—Hoanganh T. Le
*Attorney, Agent, or Firm*—Jay H. Maioli

[57] ABSTRACT

An antenna coupling apparatus, an external-antenna connecting apparatus, and an onboard external-antenna connecting apparatus which inhibits unnecessary power emissions, reduces transmission loss, and offers high durability and high ease of operation, has an electromagnetic coupling element consisting of a conductor that is not in contact with a first antenna with respect to DC components and a ground conductor element consisting of a conductor that is not in contact with the first antenna with respect to DC components and in contact with a ground conductor with respect to DC components and reflecting the power transmitted or received by the first antenna toward the electromagnetic coupling element. An external-antenna connecting apparatus and an onboard external-antenna connecting apparatus have an electromagnetic coupling circuit in their bodies that electromagnetically couples the antenna of a portable radio terminal and an external antenna, with the external-antenna connecting apparatus and the onboard external-antenna connecting apparatus, being not in contact with the portable radio terminal with respect to DC components, when the portable radio terminal is secured in the bodies.

6 Claims, 11 Drawing Sheets

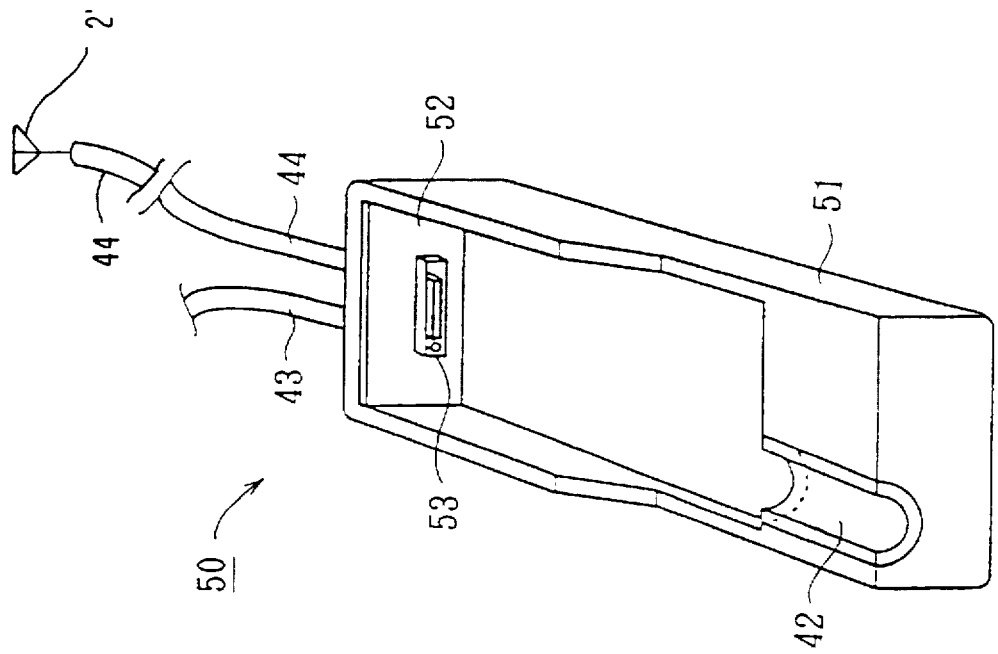
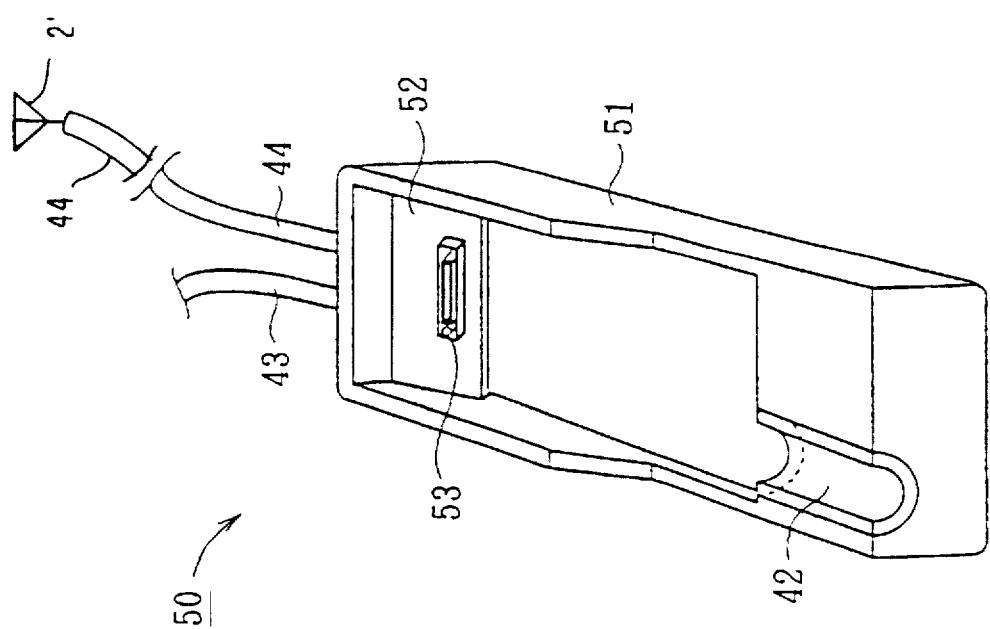

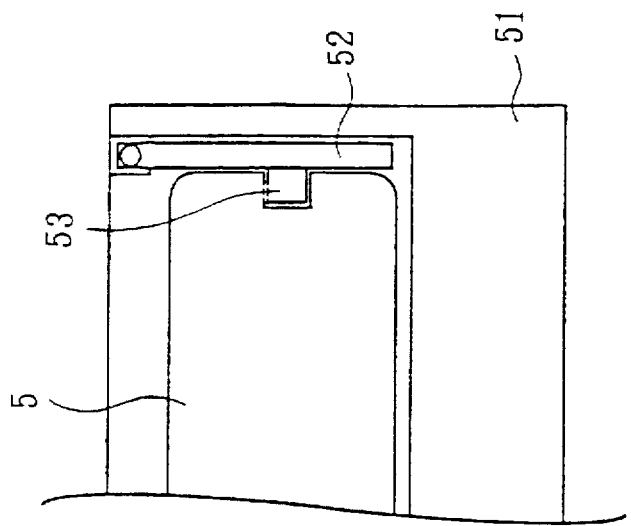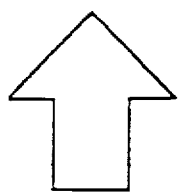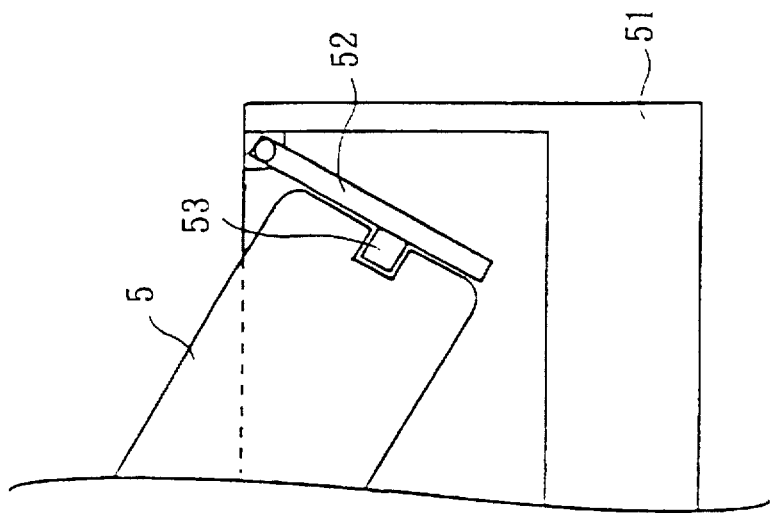
FIG. 12

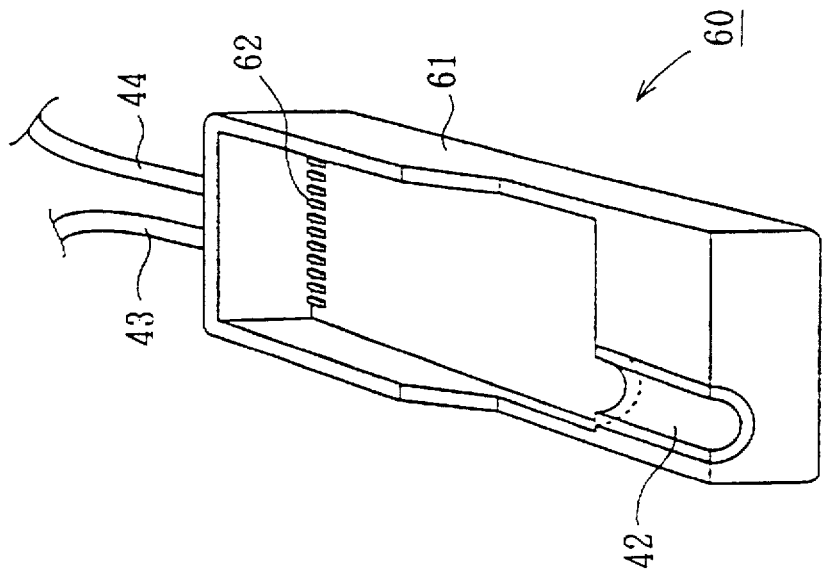
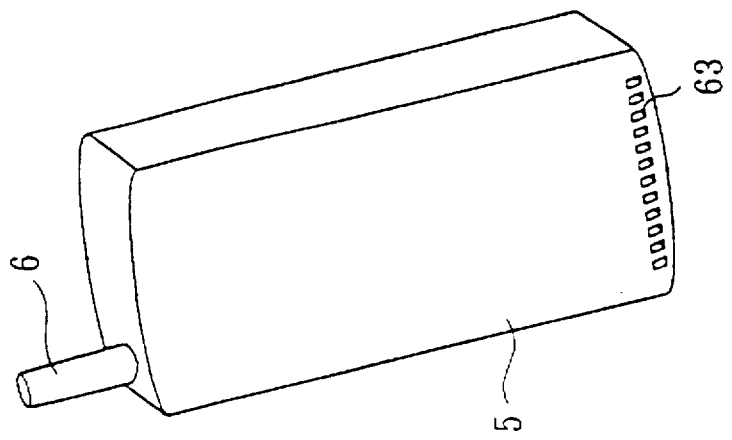
FIG. 13A
FIG. 13B

ANTENNA COUPLING APPARATUS, EXTERNAL-ANTENNA CONNECTING APPARATUS, AND ONBOARD EXTERNAL-ANTENNA CONNECTING APPARATUS

BACKGROUND OF THE INVENTION

1. Field of the Invention

The present invention relates to an antenna coupling apparatus, an external-antenna connecting apparatus, and an onboard external-antenna connecting apparatus, which are suitable for electromagnetically coupling an antenna installed to a portable radio terminal and an external antenna installed to an automobile.

2. Description of the Related Art

An antenna coupling apparatus using electromagnetic coupling, called a coupler, has widely been used for onboard antenna kits to couple the antenna installed to a portable radio terminal, such as a portable phone, with an external antenna installed to an automobile.

FIG. 1 shows an example of the antenna coupling apparatus. An antenna coupling apparatus 1 comprises an electromagnetic coupling element 2 and a transmission cable 3. The electromagnetic coupling element 2 of the antenna coupling apparatus 1, which element is ring-shaped, is connected to the core of the transmission cable 3 (in some cases, the element is connected to a ground conductor 4 through a nonconducting member as shown in FIG. 1). Inserting the antenna 6 fitted with a nonconducting cover and disposed on a portable radio terminal 5 into the ring-shaped electromagnetic coupling element 2 allows the power received from an external antenna 2' to be transmitted through the electromagnetic coupling element 2 to the portable radio terminal 5 and the power transmitted by the portable radio terminal 5 to be transferred to the external antenna without contact with respect to DC components.

FIG. 2 shows an example of an external-antenna connecting apparatus connecting an external antenna and the antenna of a portable radio terminal together. The external-antenna connecting apparatus 10 comprises a curled cord 11 and a connector 12 that connect the external antenna and an external power supply (not shown). Connecting the connector 12 of the antenna connecting apparatus 10 to a connector terminal 14 in the lower part of a portable radio terminal 13 allows the terminal 13 to receive power from the external power supply and transmit a radio frequency (RF) signal to, or receive it from, the external antenna through the curled cord 11 and the connector 12.

As shown in FIG. 3, an external antenna connecting apparatus 15 comprises an electromagnetic coupling circuit 18, fitted with a nonconducting cover, and a transmission cable 19. The electromagnetic coupling circuit 18 is provided with a hole corresponding to the antenna 17 to install the antenna 17, fitted with a nonconducting cover, of a portable radio terminal 16. For the external-antenna connecting apparatus 15, fitting the electromagnetic coupling circuit 18 over the antenna 17 in the direction indicated by an arrow allows the antenna 17 and the electromagnetic coupling circuit 18 to be electromagnetically coupled together and thus an RF signal to be transmitted to, or received from, the external antenna.

An antenna coupling apparatus incorporating an electromagnetic coupling element electrically connects a portable radio terminal and an external antenna together, using electromagnetic coupling.

It is difficult for the conventional antenna coupling apparatus 1, of FIG. 1 to receive all the power emitted from the antenna 6, using only the electromagnetic coupling element 2, so that unnecessary power emissions occur. Thus the apparatus 1 poses a problem of heavy loss which occurs when power is transmitted.

In the external-antenna connecting apparatus 10 of FIG. 2, a cable for transmitting an RF signal from an antenna power supply (not shown) installed on the portable radio terminal to the connector terminal 14 must be installed in the portable radio terminal 13 to enable an RF signal to be transmitted to, or received from, the external antenna.

The cable installed, however, may cause the performance of the portable radio terminal 13 to be deteriorated when the terminal 13 is used independently. What is worse, installing the cable inside the portable radio terminal may causes the portable radio terminal to be difficult to reduce in size.

The external-antenna connecting apparatus 15 in FIG. 3 has the disadvantage in that the electromagnetic coupling circuit 18 is not easy to fit over the antenna 17 of the portable radio terminal 16.

Poor adhesion between the electromagnetic coupling circuit 18 and the antenna 17 causes the circuit 18 to shift, resulting in an unstable coupling with the antenna 17.

Thus increasing adhesion between the electromagnetic coupling circuit 18 and the antenna 17 causes the portable radio terminal 16 to be more frequently used by a user, so that the antenna 17 is more often installed in, or removed from, the electromagnetic connecting circuit. Since the nonconducting covers for the antenna 17 and the electromagnetic coupling circuits 18 are overloaded due to friction, their durability may be lowered. If the antenna 17 is of a threaded type, it may come off the body of the portable radio terminal 16 as the antenna connecting apparatus 15 is installed or removed.

SUMMARY OF THE INVENTION

In view of the foregoing, an object of the present invention is to provide an antenna coupling apparatus, an external-antenna connecting apparatus, and an onboard external-antenna connecting apparatus which inhibits unnecessary power emissions, reduces transmission loss, and offers high durability and ease of operation.

The foregoing object and other objects of the present invention have been achieved by the provision of an antenna coupling apparatus which is provided with an electromagnetic coupling element consisting of a conductor that is out of contact with a first antenna with respect to DC components and that electromagnetically couples the first antenna and a second antenna together and which has a ground conductor element consisting of a conductor that is out of contact with the first antenna with respect to DC components and in contact with a ground conductor with respect to DC components and that reflects the power transmitted or received by the first antenna toward the electromagnetic coupling element.

For an external-antenna connecting apparatus according to the present invention, a body to which a portable radio terminal is secured by positioning the terminal from above, and an electromagnetic coupling circuit that electromagnetically couples the antenna of the portable radio terminal and an external antenna together, being out of contact with the portable radio terminal with respect to DC components, when the portable radio terminal is positioned in the body is disposed inside the body.

For an onboard external-antenna connecting apparatus according to the present invention, a body to which a portable radio terminal is secured by positioning the terminal from above, an electromagnetic coupling circuit that electromagnetically couples the antenna of the portable radio terminal and an external antenna together, being out of contact with the portable radio terminal with respect to DC components, when the portable radio terminal is positioned in the body is disposed inside the body, and a connecting member is provided which connects an external power supply with the portable radio terminal to feed power from the power supply to the terminal.

In an antenna coupling apparatus, an electromagnetic coupling element consisting of a conductor that is out of contact with a first antenna with respect to DC components and electromagnetically couples the first antenna and a second antenna together and a ground conductor element consisting of a conductor that is out of contact with the first antenna with respect to DC components and in contact with a ground conductor with respect to DC components and reflects the power transmitted or received by the first antenna toward the electromagnetic coupling element can be fitted with the first antenna to electromagnetically couple the electromagnetic connecting element and the ground conductor element with the first antenna, thus inhibiting unnecessary power emissions and reducing transmission loss.

An external-antenna connecting apparatus and an onboard external-antenna connecting apparatus, wherein a portable radio terminal is positioned from above to secure it to a body and an electromagnetic coupling circuit that is out of contact with the portable radio terminal with respect to DC components is disposed in the body, and the portable radio terminal is positioned from above the body to electromagnetically couple the antenna of the portable radio terminal and an external antenna together, allow durability between a conventional electromagnetic coupling or portable radio terminal and the antenna, and allow the ease of operation by a user to be improved.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 11A and 11B are schematic diagrams showing the general arrangement of the onboard external-antenna connecting apparatus in use and not in use according to the third embodiment;

FIG. 12 is a schematic diagram explaining a mechanism of the moving part of the onboard external-antenna connecting apparatus of FIGS. 11A and 11B; and FIGS. 13A and 13B are schematic diagrams showing the general arrangement of the onboard external-antenna connecting apparatus according to another embodiment.

DETAILED DESCRIPTION OF THE EMBODIMENT

Preferred embodiments of the present invention will be described with reference to the accompanying drawings:

(1-1) First Embodiment

Figure 1:
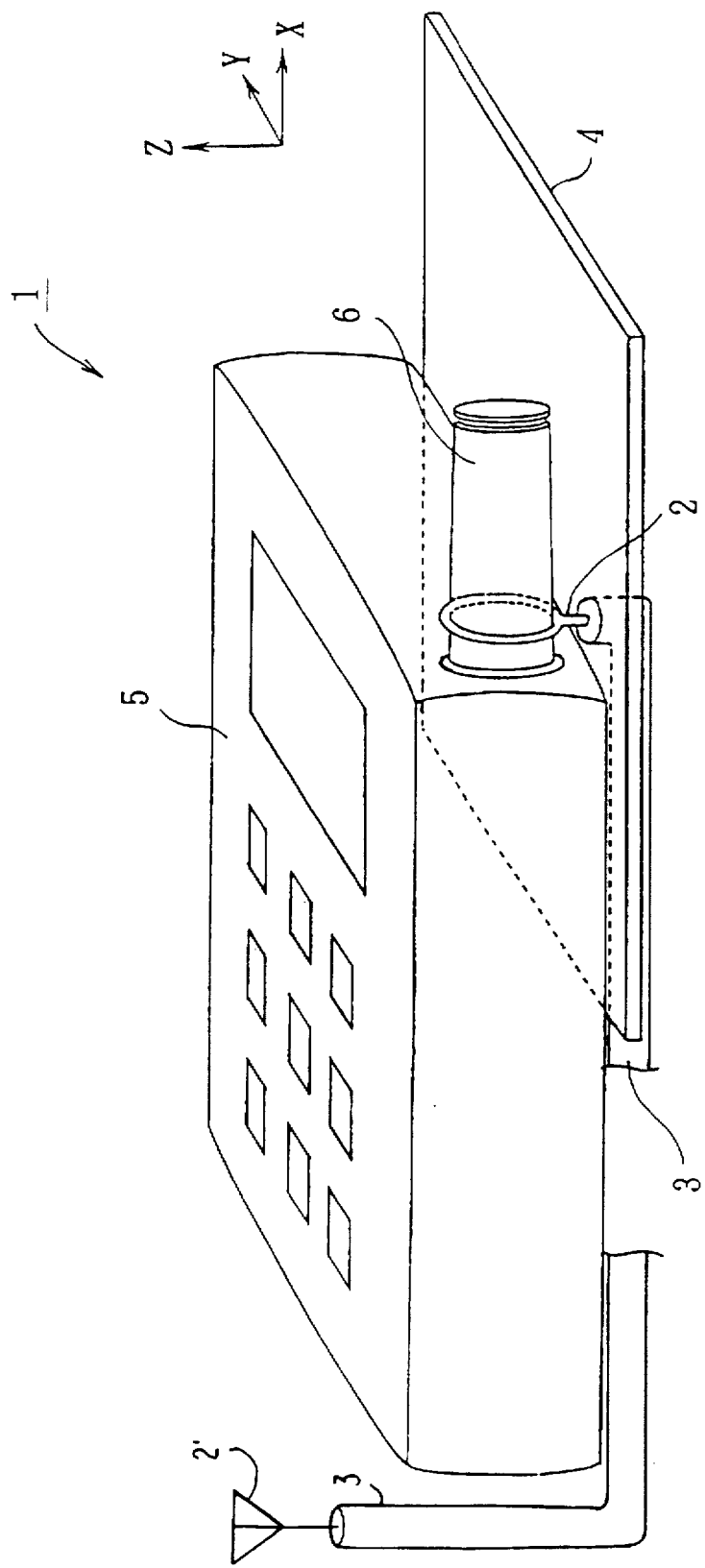
FIG. 1 is a schematic diagram showing the general arrangement of a conventional antenna coupling apparatus.
Figure 2:
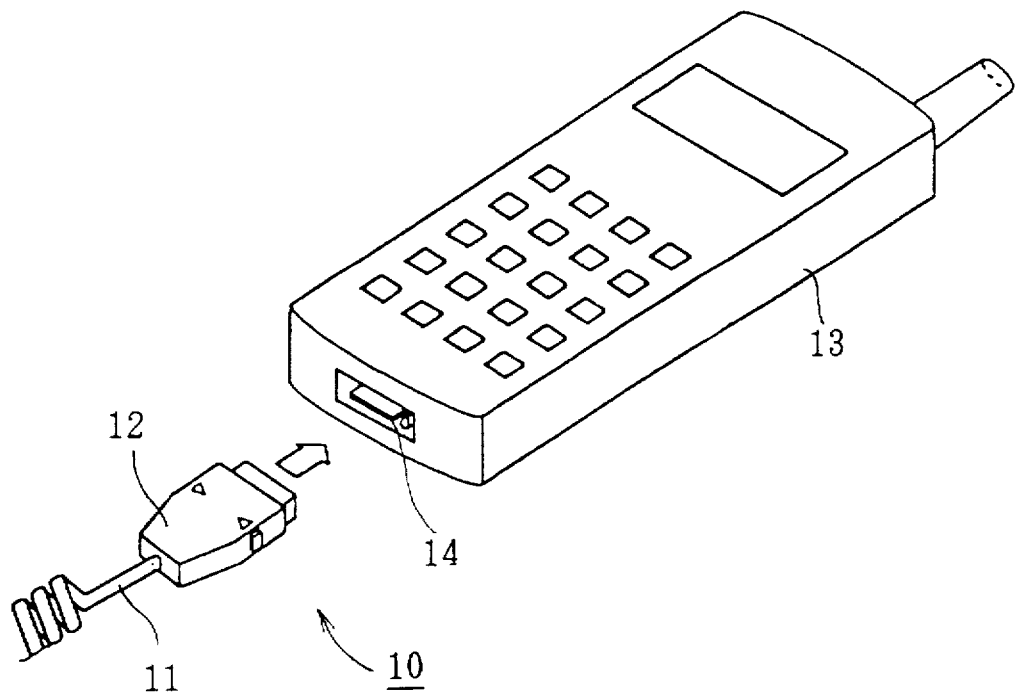
FIG. 2 is a schematic diagram showing the general arrangement of a conventional external-antenna connecting apparatus.
Figure 3:
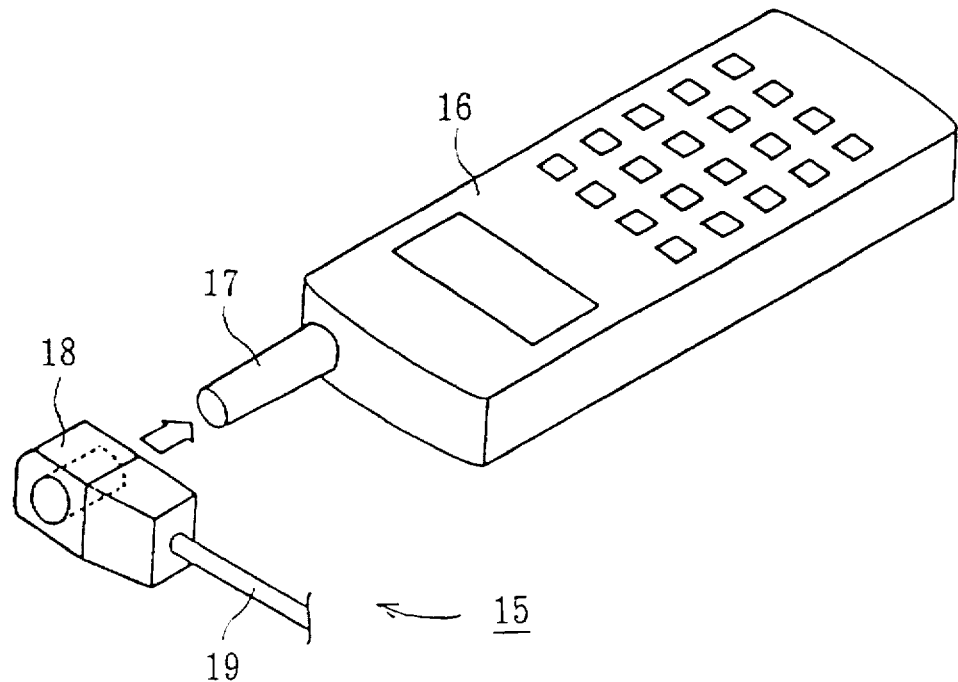
FIG. 3 is a schematic diagram showing the general arrangement of a conventional external-antenna connecting apparatus.
Figure 4:
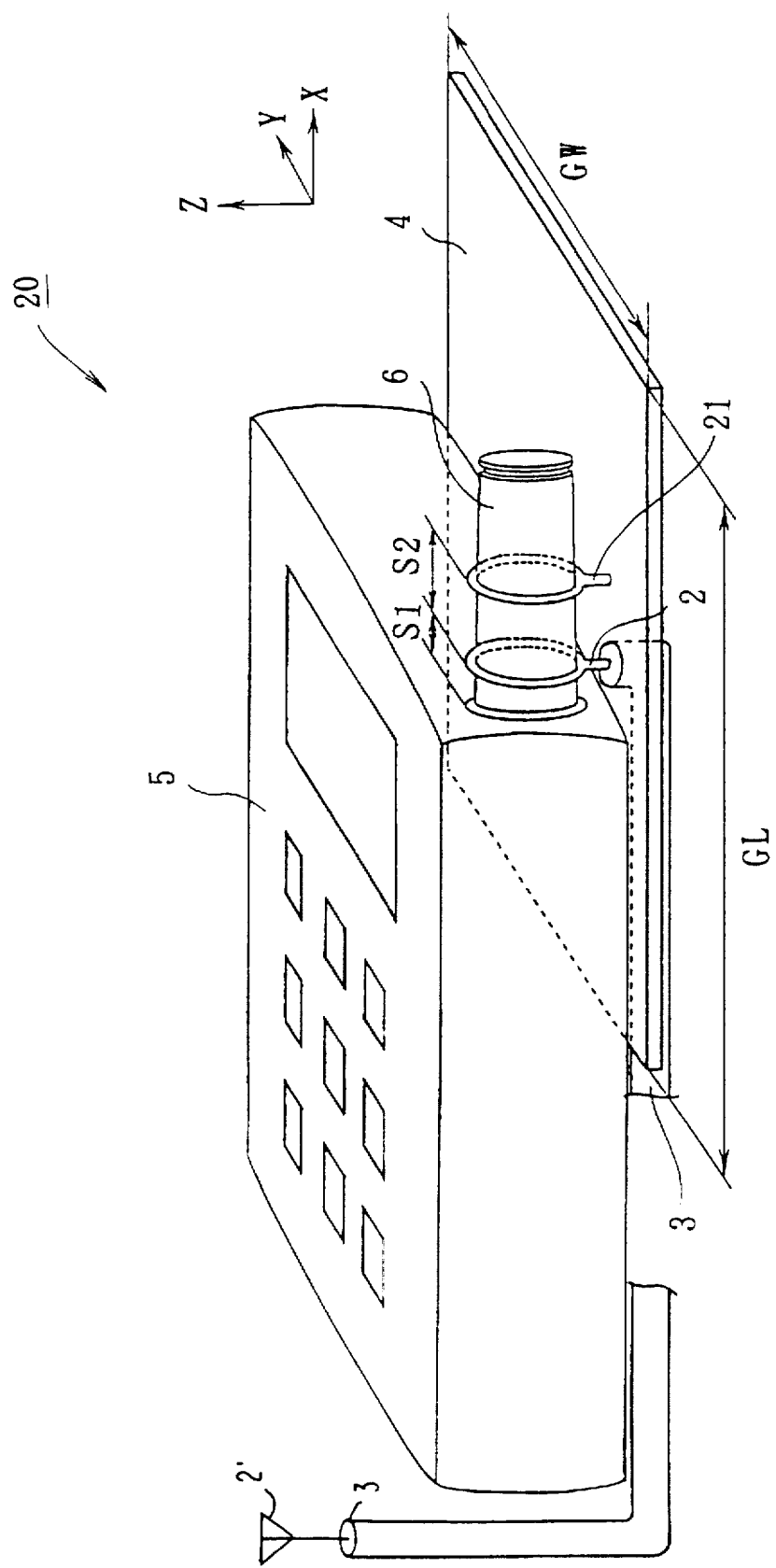
FIG. 4 is a schematic diagram showing the general arrangement of the antenna coupling apparatus according to the first embodiment of the present invention.

FIG. 4, in which the same reference characters designate common parts as in FIG. 1, shows the general arrangement of the antenna coupling apparatus in the first embodiment of the present invention. The antenna coupling apparatus 20 comprises an electromagnetic coupling element 2, a transmission cable 3, a ground conductor element 21, and a ground conductor 4.

The electromagnetic coupling element 2 and the ground conductor element 21 are ring-shaped. The electromagnetic coupling element 2 electromagnetically couples an external antenna (not shown 2') with the antenna 6, which is a helical antenna fitted with a nonconducting cover, of a portable radio terminal 5. The core of the transmission cable 3 connected to the external cable is connected to the electromagnetic coupling element 2; the outer conductors of the transmission cable 3 are connected to the ground conductor 4. The ground conductor element 21, reflecting unnecessarily emitted power, is disposed on the ground conductor 4 physically in parallel with the electromagnetic coupling element 2, with an interval S2 in between, and is in electrical contact with the ground conductor 4.

The ground conductor 4 is fitted with the antenna 6 on its top. This is done so that the body of the portable radio terminal 5 is arranged on the electromagnetic coupling element 2 side. The electromagnetic coupling element 2 and the ground conductor element 21 may be disposed at any position according to the size of the antenna 6, the electromagnetic coupling element 2, and the ground conductor element 21.

In the above arrangement, the antenna 6 installed on the portable radio terminal 5 is inserted into the electromagnetic coupling element 2 and the ground conductor element 21 both of which have a ring shape. When placed in the electromagnetic coupling element 2, the antenna 6 is electromagnetically coupled to the external antenna, not shown. Some of the power transmitted from the antenna 6 is received by the electromagnetic coupling element 2. Some of the remaining power that is not received by the electromagnetic coupling element 2, that is, some of the power that has thus far been unnecessarily emitted is reflected by the ground conductor element 21 toward the electromagnetic coupling element 2 side and received by the electromagnetic coupling element 2. Thus unnecessarily emitted power and transmission loss are reduced, compared with conventional portable radio terminals.

Transmission-reception processes using such type of electromagnetic coupling are reversible. For transmitting the power received by the external antenna to the portable radio terminal 5, the power is transmitted from the electromagnetic coupling element 2 through the transmission cable 3 to the antenna 6. Some of the power is received by the coupling element 2. Some of the remaining power that is not received by the coupling element 2 is reflected by the ground conductor element 21 back toward the electromagnetic coupling element 2 side and received by the antenna 6. Thus transmission loss can be reduced as in transmission.

Figure 5:
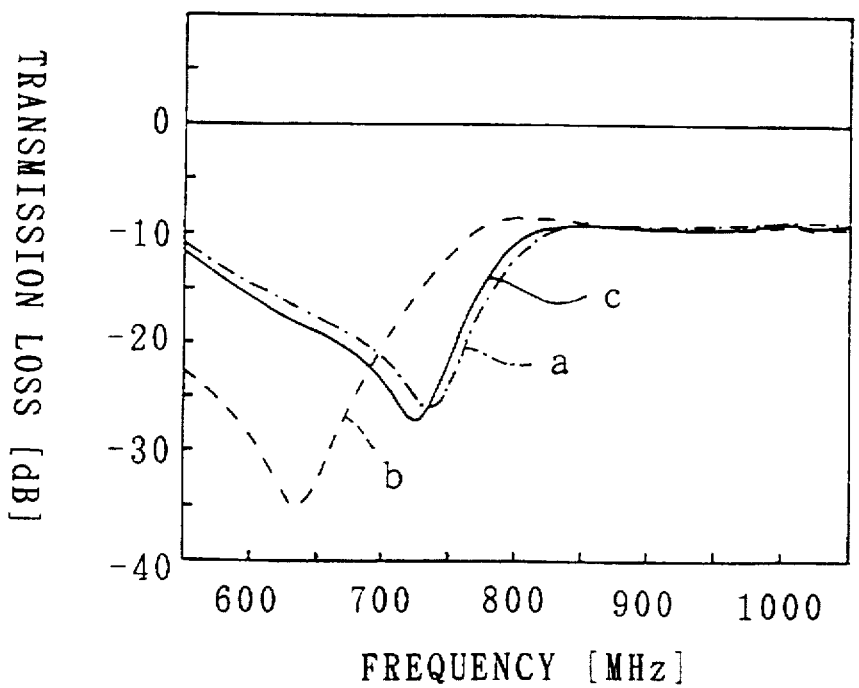
FIG. 5 is a characteristic curvilinear diagram showing the passage characteristics of the antenna coupling apparatus according to the first embodiment and a conventional antenna coupling apparatus.

FIG. 5 shows the characteristics of power passage from the antenna coupling apparatus 20 of the first embodiment and a conventional antenna coupling apparatus 1 to a portable radio terminal antenna. In FIG. 5, curves a and c represent the characteristics of the conventional antenna coupling apparatus 1 (without a ground conductor element), and curve b represents the characteristics of the antenna coupling apparatus 20, having the ground conductor element 21, of the first embodiment. Curve a is for an electromagnetic coupling element 2 having a width of 3 mm, and curve c is for an electromagnetic coupling element 2 having a width of 2.2 mm.

FIG. 5 showing that the ground conductor element 21 allows consistent characteristics to be provided over a wide frequency range proves that the element is effective. The example measurements of FIG. 5 disclose that the antenna coupling apparatus using the electromagnetic coupling element having a width of 2.2 mm (curve c in FIG. 5) exhibits a little more consistent characteristic than that using the electromagnetic coupling element 2 having a width of 3.0 mm (curve a in FIG. 5) over a wide frequency range.

In the above arrangement, disposing the ground conductor element 21, which is in contact with the ground conductor 4 with respect to DC components, in parallel with the electromagnetic coupling element 2, with the interval S2 in between, allows a consistent characteristic to be provided over a broad frequency range. Arranging the ground conductor element 21 can cause some of the power that has thus far been unnecessarily emitted to be reflected toward the electromagnetic coupling element 2 side. Thus transmission loss is reduced, compared with conventional antenna couplers.

(1-2) Variation

In the first embodiment described above, a helical antenna fitted with a nonconducting cover is used as the antenna 6 of the portable radio terminal 5, however, the present invention may use not only such a helical antenna but a monopole antenna fitted with a nonconducting cover as an antenna of the portable radio terminal or a composite antenna fitted with a nonconducting cover, which antenna consists of a helical antenna and a monopole antenna.

In the first embodiment described above, the antenna 6 of the portable radio terminal 5 and the external antenna are electromagnetically coupled together, however, the present invention may use not only such a combination but an electromagnetic coupling of the antenna of the portable radio terminal with, for example, a given high-frequency circuit.

Further in the first embodiment described above, the electromagnetic coupling element 2 and the ground conductor element 21 that are both in ring shape which is closed against loop current, however, the present invention may use not only such a ring-shaped electromagnetic coupling element and a ring-shaped ground conductor element but an electromagnetic coupling element and a ground conductor element, both of which are open at the top like a letter of the alphabet U or are of ring or U shape having a width in the X direction.

Figure 6:
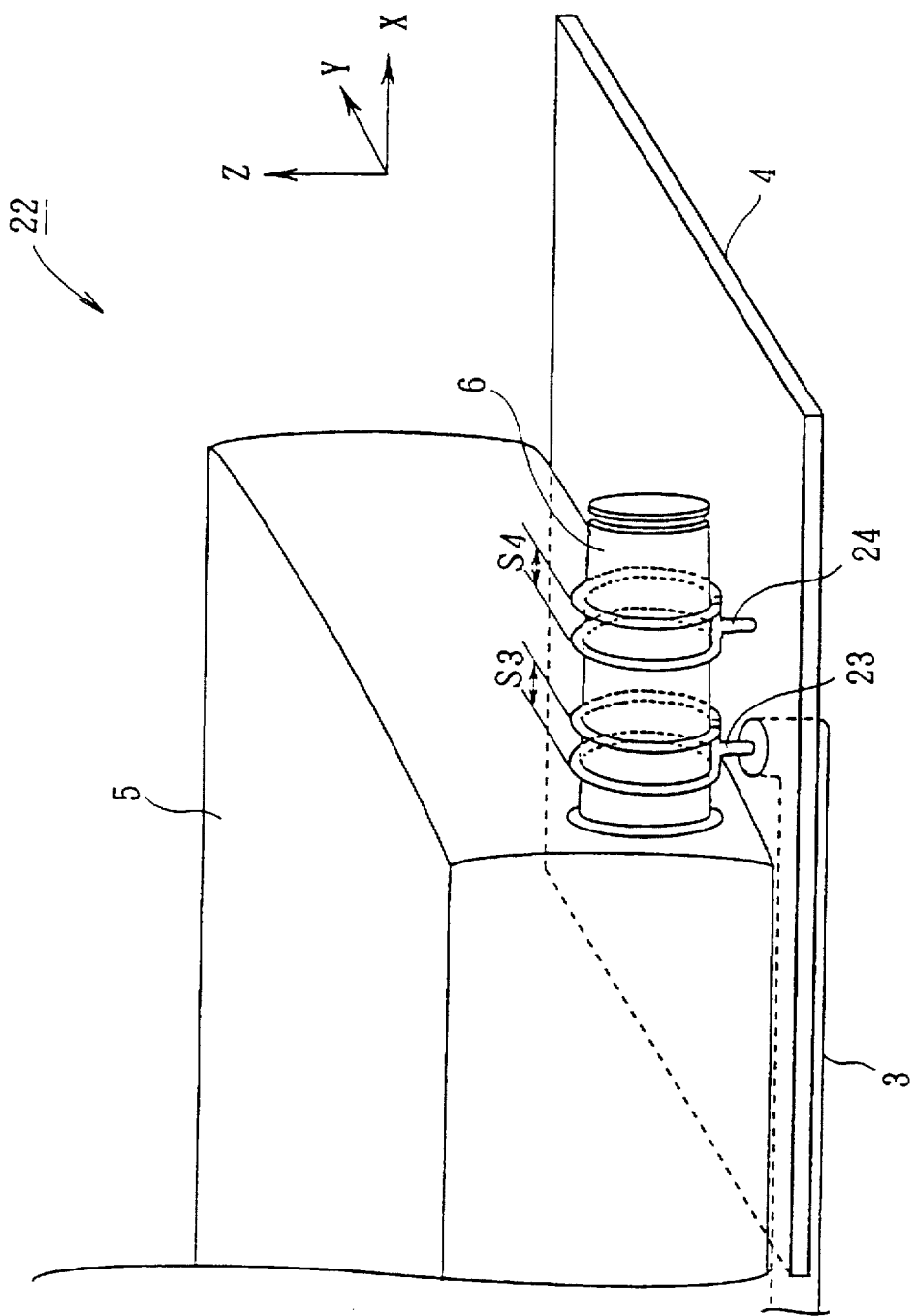
FIG. 6 is a schematic diagram showing the general arrangement of the antenna coupling apparatus according to another embodiment.

As shown in FIG. 6, for example, where the same reference characters designate common parts as in FIG. 4, a plurality of electromagnetic coupling elements 23 and a plurality of ground conductor elements 24 may be provided. Disposing in the antenna coupling apparatus 22 the electromagnetic coupling elements 23 and the ground conductor elements 24 at any plurality of positions, taking into account the matching of the antenna 6 installed on the portable radio terminal 5, causes transmission loss due to the antenna 6 to be effectively reduced.

Figure 7:
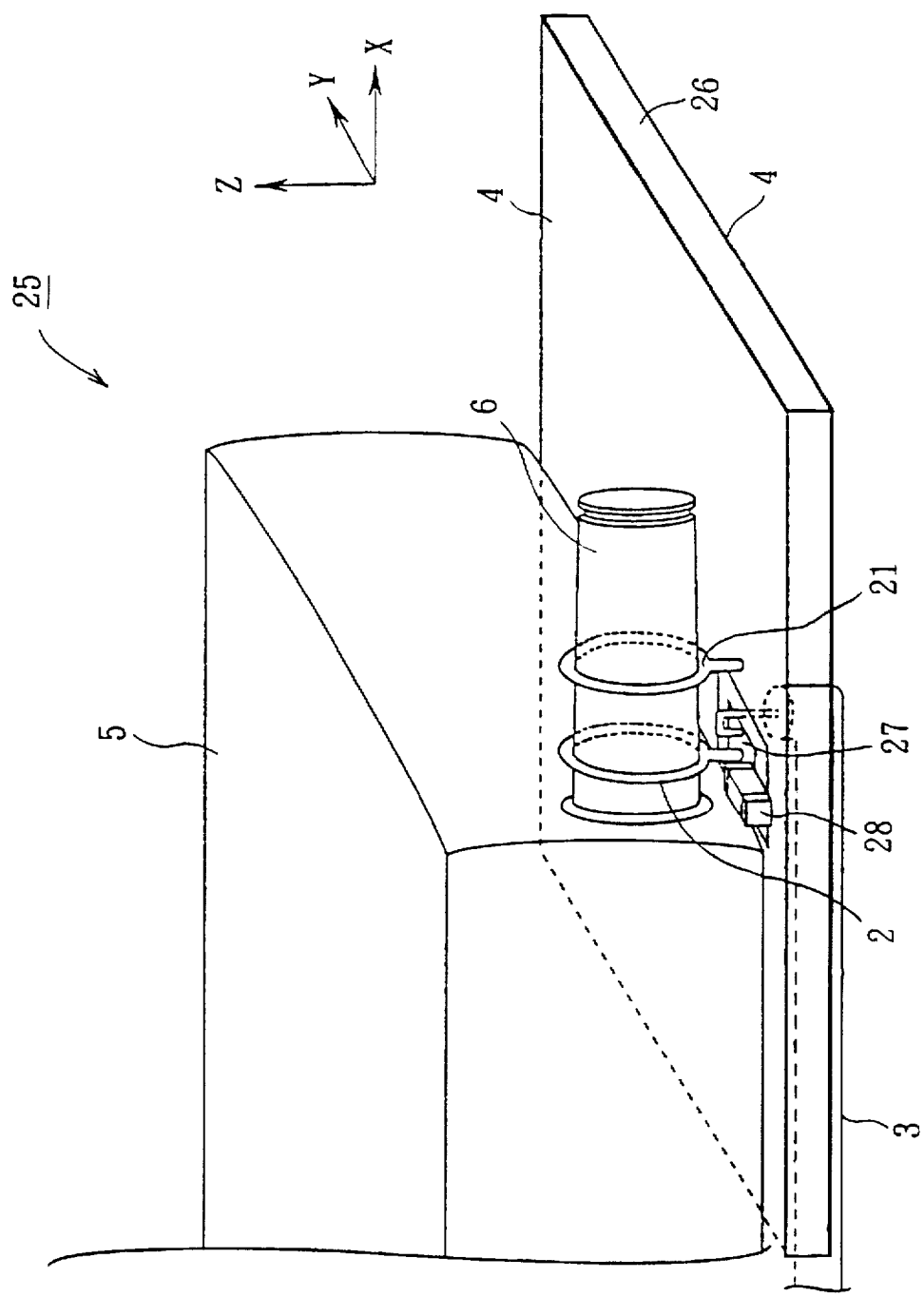
FIG. 7 is a schematic diagram showing the general arrangement of the antenna coupling apparatus according to still another embodiment.

The transmission cable connected to the external antenna and the antenna 6 of the portable radio terminal 5 may not match each other. To solve this problem, a metal part 27 that is isolated with respect to DC components from the ground conductor 4 is provided on the ground conductor 4 on a top surface of a dielectric base 26, both sides of which are covered with metal, in an antenna coupling apparatus 25 of FIG. 7. Forming a matching circuit consisting of an electromagnetic coupling element 2, a chip element 28 (capacitor or coil), and the like on the metal part 27 causes the matching between the antenna 6 and the antenna coupling apparatus 25 to be improved.

Figure 8:
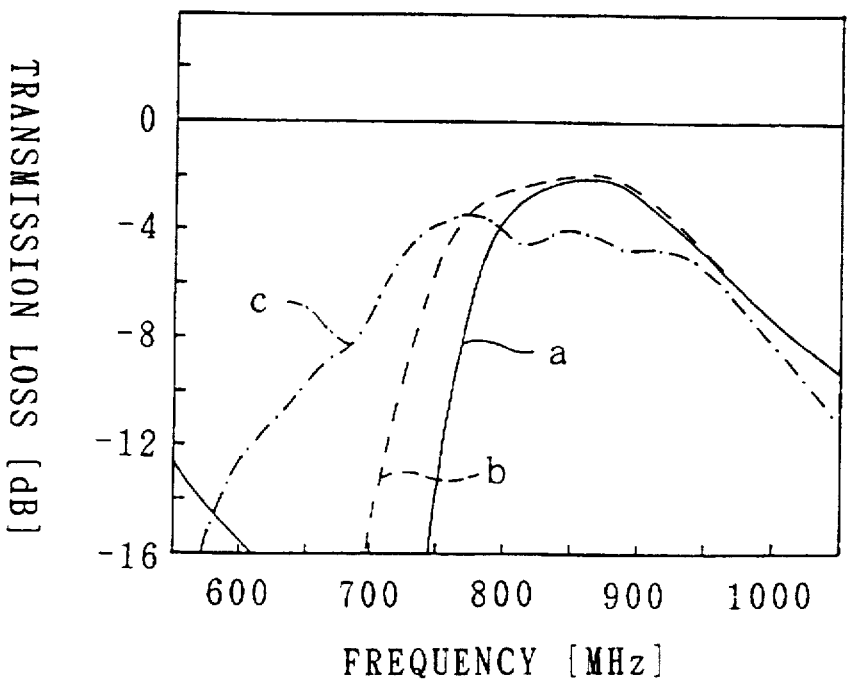
FIG. 8 is a characteristic curvilinear diagram showing changes in the connection characteristics of an antenna coupling apparatus due to the availability of a ground conductor element and a matching circuit.

For the above arrangement, FIG. 8 shows the characteristic of coupling between the antenna coupling apparatus and the antenna of the portable radio terminal. A letter of the alphabet a designates the characteristic curve of a conventional antenna coupling apparatus 1 (having no ground conductor element) whose matching condition is improved by forming a matching circuit, and a letter of the alphabet b indicates the characteristic curve of an antenna connecting apparatus whose matching condition is improved by providing a ground conductor element 21 and a matching circuit as in the case of the antenna coupling apparatus 25. Curve c shows the characteristic of an antenna coupling apparatus without a ground conductor element and a ground conductor whose matching condition is improved by forming a matching circuit.

These characteristic curves show that providing an antenna coupling apparatus with a ground conductor reduces transmission loss. It also shows that installing a ground conductor element in an antenna coupling apparatus having a matching circuit reduces transmission loss over a wider frequency range. Because the matching condition of the antenna coupling apparatus can be improved in these ways, that of the portable radio terminal antenna can be prevented from deteriorating.

(2) Second Embodiment

Figure 9:
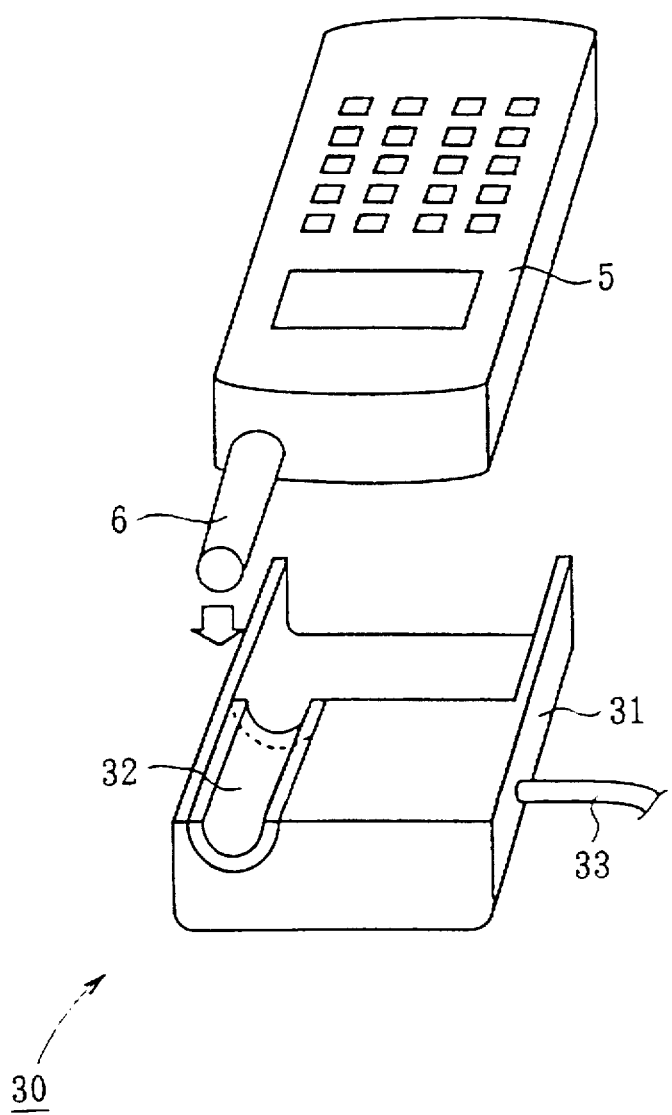
FIG. 9 is a schematic diagram showing the general arrangement of the external-antenna connecting apparatus according to the second embodiment of the present invention.

FIG. 9 shows the general arrangement of the external-antenna connecting apparatus of the second embodiment. The external-antenna connecting apparatus 30 comprises a case 31, an electromagnetic coupling circuit 32, and a transmission cable 33. The electromagnetic coupling circuit 32 corresponds to a U-shaped electromagnetic coupling element 2 and a U-shaped ground conductor element 21 of the antenna coupling apparatus 20.

The case 31 for the external-antenna connecting apparatus 30 is shaped to cover the upper part of the portable radio terminal 5, which part includes the antenna 6 installed to the terminal, and to hold the entire portable radio terminal 5 when fitted over the terminal 5 to the case 31.

The electromagnetic coupling circuit 32 fitted with a nonconducting cover is disposed over the region of the case 31 where the antenna 6 is placed. The electromagnetic coupling apparatus 32 has a U-shaped cross section corresponding to the dimensions of the antenna 6, which is a helical antenna fitted with a nonconducting cover.

The transmission cable 33 is connected to the case 31, which cable 33 is adapted to transmit power from the external antenna through the electromagnetic coupling circuit 32 to the antenna 6.

In the above arrangement, the portable radio terminal 5 is positioned on the top surface of the case 31 for the external-antenna connecting apparatus 30. The upper part of the portable radio terminal 5 including the antenna 6 is directly placed on the case 31 and the entire portable radio terminal is held in the hand of the user.

The antenna 6, when positioned over the electromagnetic coupling circuit 32 disposed on the case 31, is electromagnetically coupled with the circuit 32. The electromagnetic coupling circuit 32 receives the power transmitted by the antenna 6 and sends the power through the transmission cable 33 to the external antenna. For transmitting the power received from the external antenna to the portable radio terminal 5, the power received from the external antenna is fed through the transmission cable 33 and the electromagnetic coupling circuit 32 to the antenna 6.

In the above arrangement, the electromagnetic coupling circuit 32 fitted with the nonconducting cover is disposed over the region of the case 31, shaped so that the upper part of the portable radio terminal 5 including the antenna 6 can be placed thereon, in which region the antenna 6 is placed, and the case 31 is provided with the transmission cable 33 connected to the electromagnetic coupling circuit 32. Thus the body of the portable radio terminal 5 and the antenna coupling apparatus 30 are secured by the body of the portable radio terminal 5 and the case 31, so that a stable electromagnetic coupling can be made without overloading the antenna 6.

Unlike conventional portable radio terminals, the portable radio terminal 5 does not need to be provided therein with a cable and a switch which connect an antenna power supply with a connector, since power is exchanged between the electromagnetic coupling circuit 32 and the antenna 6. This allows the portable radio terminal 5 to be upgraded and reduced in size and its cost to be lowered.

In the second embodiment described above, a helical antenna fitted with a nonconducting cover is used as the antenna 6 of the portable radio terminal 5, however, the present invention may use not only such a helical antenna but a monopole antenna fitted with a nonconducting cover or a composite antenna fitted with a nonconducting cover, which antenna consists of a helical antenna and a monopole antenna.

Also in the second embodiment described above, the electromagnetic coupling circuit 32 is fitted with the nonconducting cover, however, the present invention may use not only such an electromagnetic coupling circuit 32 but an exposed one.

Again in the second embodiment described above, the case 31 that is shaped so that the upper part of the portable radio terminal 5 including the antenna 6 of the portable radio terminal 5 can be positioned on the case, however, the present invention may use not only such a case but one that is shaped to bear a part of the portable radio terminal 5 including the antenna 6 and stably to hold the body of the terminal 5.

(3-1) Third Embodiment

Figure 10:
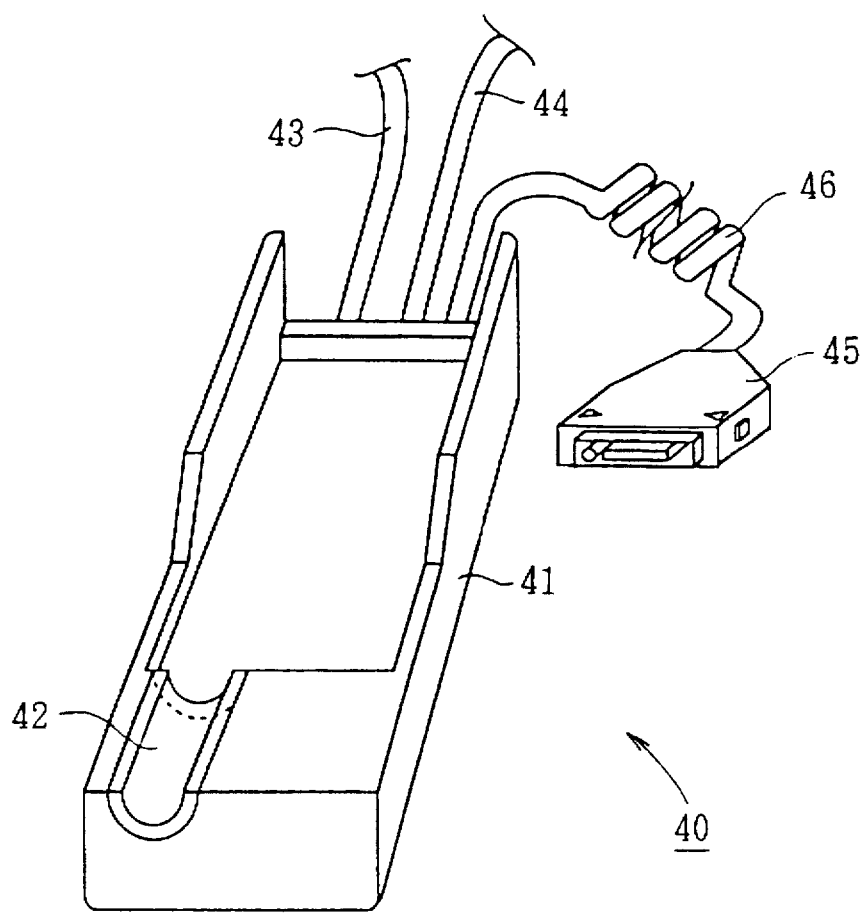
FIG. 10 is a schematic diagram showing the general arrangement of the onboard external connecting apparatus according to the third embodiment of the present invention.

FIG. 10 shows the general arrangement of the onboard external-antenna connecting apparatus of the third embodiment.

The onboard external-antenna connecting apparatus 40, an onboard unit having the external-antenna connecting apparatus 30 of the second embodiment, comprises a case 41, an electromagnetic coupling circuit 42, an external power supply cable 43, an RF cable 44, an external power supply connector 45, and a connector cable 46.

The case 41 for the onboard external-antenna connecting apparatus 40 is recessed according to the shape of the portable radio terminal 5 to place and secure the entire portable radio terminal 5 including the antenna 6.

The U-shaped electromagnetic coupling circuit 42 fitted with a nonconducting cover is disposed over the region of the case 41 where the antenna 6 is positioned. The electromagnetic coupling circuit 42 has a U-shaped cross section corresponding to the dimensions of the antenna 6, a helical antenna fitted with a nonconducting cover.

The case 41 is provided with the external power supply cable 43, the RF cable 44, and connector cable 46 having the external power supply connector 45 at one of its ends. The RF cable 44 is connected to the electromagnetic coupling circuit 42, through which cable electromagnetic coupling is relied on to exchange power between an external antenna 2' and the antenna 6. The external power supply cable 43 is connected to an automobile power supply or the like, and the external power supply connector 45 at one end of the connector cable 46 is connected with the connector terminal 14 of the portable radio terminal 5 to charge the battery of the terminal 5 using an automobile power supply or the like.

FIGS. 11A and 11B, in which the same reference characters designate common parts as in FIG. 10, shows an onboard external-antenna connecting apparatus 50, in whose case a connector is disposed. The onboard external-antenna connecting apparatus 50 comprises a case 51, an electromagnetic coupling circuit 42, an external power supply cable 43, and an RF cable 44. The case 51 for the onboard external-antenna connecting apparatus 50 has the electromagnetic coupling circuit 42 at one of its ends and a moving part 52 at the other end.

As shown in FIG. 12, the moving part 52 is disposed at a predetermined angle to the side of the case 51. The moving part 52, a rectangular plate on which an external power supply connector terminal 53 is disposed, which part has its upper side secured to the upper edge of a side of the case 51, can be moved by a spring between itself and the side of the case. The external power supply connector terminal 53 is adapted to be connected with the connector of the portable radio terminal 5 by positioning the terminal 5 on the case 51.

As shown in FIG. 11A, in the above arrangement, the moving part 52 of the onboard external-antenna connecting apparatus 50 is slanted at a predetermined angle when the portable radio terminal 5 is not installed in the apparatus.

When the portable radio terminal 5 is installed in the onboard external-antenna connecting apparatus 50, pushing in the body of the portable radio terminal 5 with the connector side of the terminal 5 in contact with the moving part 52 causes the moving part 52 to cooperate with the terminal and thus the rectangular plate comes to a position parallel with the side of the case 51. As a result, the portable radio terminal 5 is stably secured to the onboard external-antenna connecting apparatus 50, so that the apparatus can easily be connected with the connector terminal of the portable radio terminal 5.

When the portable radio terminal 5 is in the onboard external-antenna connecting apparatus 50, connecting the external power supply cable 43 with an automobile power supply and so on allows the battery of the terminal 5 to be charged. The RF cable 44 is connected to an external antenna to transmit the power from the external antenna through the RF cable 44 to the antenna 6 of the portable radio terminal 5, using electromagnetic coupling due to the electromagnetic coupling circuit 42. Electromagnetic coupling causes the power from the antenna 6 of the portable radio terminal 5 to be transmitted through the RF cable 44 to the external antenna.

Unlike conventional onboard external-antenna connecting apparatuses, the onboard external connecting apparatus 40 arranged as described above does not need to be provided in the portable radio terminal 5 with a cable and a switch which connect an antenna power supply with a connector, since power is exchanged between the electromagnetic coupling circuit 42 and the antenna 6. This allows the portable radio terminal 5 to be improved for performance and reduced in size.

For the onboard external-antenna connecting apparatus 40, connecting the external power supply connector 45 with the connector terminal 14 of the portable radio terminal 5 and connecting the external power supply cable 43 with an automobile power supply through the connector cable 46 allows the battery of the terminal 5 to be charged and a call to be made using the automobile power supply. That is, the onboard external-antenna connecting apparatus 40 has a structure suitable for arranging a handsfree unit that allows a call to be made inside an automobile without holding the portable radio terminal 5 in hand.

The onboard external-antenna connecting apparatus 50, having the moving part 52 inside the case 51, allows not only electromagnetic coupling to be made without overloading the antenna 6 of the portable radio terminal but the battery of the terminal 5 to be charged and a call to be made using an automobile power supply. In addition, the onboard external-antenna connecting apparatus enables the portable radio terminal 5 to be improved for performance and reduced in size.

(3-2) Variation

In the third embodiment described above, the case 51 is provided with the moving part 52, on which the external power supply connector 53 is installed, however, the present invention may use a case where an external power supply connector terminal is directly installed.

FIGS. 13A and 13B, in which the same reference characters designate common parts as in FIGS. 11A and 11B, show the general arrangement of a variation of the onboard external-antenna connecting apparatus. An onboard external-antenna connecting apparatus 60 comprises a case 61, an electromagnetic coupling circuit 42, an external power supply connector terminal array 62, an external power supply cable 43, and an RF cable 44.

The external power supply connector terminal array 62 consisting of a plurality of metal pieces is disposed in the case 61. The external power supply connector terminal array 62 is a connector protruded from a surface of the case, which connector is installed along a side of the bottom of the case 61, in which the bottom of the portable radio terminal 5 is placed. A recessed connector terminal array 63 (for example, a female connector) matching the metal pieces constituting the external power supply connector terminal array 62 is disposed in the lower part of the back of the body of the portable radio terminal 5.

Housing the portable radio terminal 5 in the onboard external-antenna connecting apparatus 60 to connect the external power supply connector terminal array 62 with the connector terminal array 63 causes the apparatus 60 and the terminal 5 to electrically come in contact with each other and thus the terminal 5 to be connected with an external power supply or the like. The onboard external-antenna connecting apparatus 60 allows not only electromagnetic coupling to be made without overloading the antenna 6 of the portable radio terminal 5 but also the battery of the terminal 5 to be charged and a call to be made using an automobile power supply. In addition, the onboard external-antenna connecting apparatus 60 enables the portable radio terminal 5 to be improved for performance and reduced in size.

As described above, according to the present invention, an antenna coupling apparatus is provided with an electromagnetic coupling element comprising a conductor that is not in contact with a first antenna with respect to DC components and electromagnetically couples the first antenna and a second antenna together and with a ground conductor element comprising a conductor that is not in contact with the first antenna with respect to DC components and in contact with a ground conductor with respect to DC components and reflects the power transmitted or received by the first antenna toward the electromagnetic coupling element in order to inhibit unnecessary power emissions and reduce transmission loss.

Furthermore, according to the present invention, a portable radio terminal is positioned from above to secure it to a body, and an electromagnetic coupling circuit that electromagnetically couples the antenna of the portable radio terminal and an external antenna together, being not in contact with the portable radio terminal with respect to DC components, when the portable radio terminal is positioned in the body is disposed inside the body to provide an external-antenna connecting apparatus and an onboard external-antenna connecting apparatus which allow durability between a conventional electromagnetic coupling or portable radio terminal and the antenna, and the ease of operation by a user to be improved.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An antenna coupling apparatus comprising:

a first antenna connected to a portable radio terminal;

a second antenna separated from said first antenna;

an electromagnetic coupling element consisting of a conductor that electromagnetically couples said first and second second antennas together;

a ground conductor coupling element arranged adjacent said electromagnetic coupling element and being electromagnetically coupled to said first antenna; and a ground conductor element arranged proximate said first antenna and being electrically connected to said ground conductor coupling element for reflecting power transmitted from or received by said first antenna toward said electromagnetic coupling element, wherein said electromagnetic coupling element and said ground conductor coupling element each include an electrical conductor in the form of a ring and said ground conductor element is planar in shape.

2. An antenna coupling apparatus comprising:

a first antenna connected to a portable radio terminal;

a second antenna separated from said first antenna;

an electromagnetic coupling element consisting of a conductor that electromagnetically couples said first and second second antennas together;

a ground conductor coupling element arranged adjacent said electromagnetic coupling element and being electromagnetically coupled to said first antenna; and a ground conductor element arranged proximate said first antenna and being electrically connected to said ground conductor coupling element for reflecting power transmitted from or received by said first antenna toward said electromagnetic coupling element, wherein said electromagnetic coupling element and said ground conductor coupling element each have a plurality of electrical conductors in the form of rings.

3. An onboard external-antenna connecting apparatus for a portable radio terminal comprising:

an onboard antenna installed on the portable radio terminal;

an external antenna connected to said onboard antenna;

an external power for supplying power to the portable radio terminal;

a body for securing said portable radio terminal upon installing the portable radio terminal into said body from above;

an electromagnetic coupling circuit disposed in said body for electromagnetically coupling said onboard antenna of said portable radio terminal and said external antenna, said coupling circuit being out of contact with said portable radio terminal with respect to DC components when the portable radio terminal is secured in said body;

a connecting member arranged in said body for connecting said external power and the portable radio terminal together to supply power from said external power to the portable radio terminal;

a mounting member movably connected to said body and operating in conjunction with the installing of the portable radio terminal in said body and including a first connector for feeding power from said external power to the portable radio terminal installed on said mounting member; and a second connector installed on the portable radio terminal for receiving power from said external power when connected with said first connector.

4. The onboard external-antenna connecting apparatus according to claim 3, wherein said mounting member is movably disposed at a predetermined angle relative to a side of said body for movement by a spring arranged between said mounting member and the side of said body, so that the portable radio terminal is stably secured when installed in said body.

5. The onboard external-antenna connecting apparatus according to claim 3, further comprising:

a plurality of first metal pieces formed in said body for feeding power from said external power supply to said portable radio terminal when the portable radio terminal is installed in said body; and a plurality of second metal pieces formed in the portable telephone terminal for receiving power from said external power supply when connected with said plurality of first metal pieces.

6. The onboard external-antenna connecting apparatus according to claim 5, wherein:

one of said plurality of first metal pieces and said plurality of second metal pieces comprises protruded connnectors and the other comprises mutually matching recessed connectors.

* * * * *